United States Patent [19]

Rohn

[11] 4,201,818
[45] May 6, 1980

[54] FLEXIBLE PLASTIC FOAM

[75] Inventor: Charles L. Rohn, Bridgewater, N.J.

[73] Assignee: Mobil Oil Corporation, New York, N.Y.

[21] Appl. No.: 910,932

[22] Filed: May 30, 1978

Related U.S. Application Data

[63] Continuation-in-part of Ser. No. 732,236, Oct. 14, 1976, Pat. No. 4,105,738.

[51] Int. Cl.² .......................... B32B 3/12; B32B 3/26
[52] U.S. Cl. .................................. 428/159; 428/310; 521/918
[58] Field of Search ................. 264/293, 321, DIG. 4; 521/918; 428/158, 159, 160, 310, 311, 315

[56] References Cited

U.S. PATENT DOCUMENTS

| | | | |
|---|---|---|---|
| 1,376,321 | 4/1921 | Crozier | 264/293 |
| 3,016,317 | 1/1962 | Brunner | 428/159 |
| 3,054,146 | 9/1962 | Griffin | 264/321 |
| 3,137,611 | 6/1964 | Krolik | 264/321 |
| 3,159,700 | 12/1964 | Nakamura | 264/321 |
| 3,189,243 | 6/1965 | Lux | 156/79 UX |
| 3,222,437 | 12/1965 | Schilling | 428/310 |
| 3,285,800 | 11/1966 | Bartell et al. | 428/159 |
| 3,384,531 | 5/1968 | Parrish | 264/321 |
| 3,471,604 | 10/1969 | Butcher | 264/163 |
| 3,577,507 | 5/1971 | Corbett | 264/321 |
| 3,649,398 | 3/1972 | Keith | 428/122 |
| 3,876,494 | 4/1975 | Ogawa et al. | 428/310 |
| 4,078,959 | 3/1978 | Palfey et al. | 264/321 |

Primary Examiner—William J. Van Balen
Attorney, Agent, or Firm—Charles A. Huggett; Ronald J. Cier

[57] ABSTRACT

A flexible and foldable foam plastic sheet and a process for making same, said process comprising initially compressing the foam sheet between two surfaces at least one of which is a textured surface (e.g., screen like) to reduce the sheet in thickness and reduce or destroy the resilience of the foam, and then, when further reduction in thickness of the resulting sheet is desired, pressing the resulting compressed sheet between two substantially smooth surfaces to achieve such desired further reduction in thickness. Mechanical properties of the foam sheet so processed are desirably increased, thereby producing a foam sheet product suitable as a replacement for paper in many applications.

6 Claims, 9 Drawing Figures

FLEXIBLE PLASTIC FOAM

CROSS-REFERENCE TO RELATED APPLICATION

This is a continuation-in-part of application Ser. No. 732,236, filed Oct. 14, 1976, now U.S. Pat. No. 4,105,738, issued Aug. 8, 1978.

BACKGROUND OF THE INVENTION

1. Field of the Invention

This invention relates to foam plastic sheeting, and a process for its manufacture, that possesses paper-like characteristics.

2. Description of the Prior Art

Foamed plastic has found wide acceptance as a versatile and relatively inexpensive material. It is lightweight, highly compressible, has excellent insulating properties, lends itself readily to molding into products with good eye-appeal and can be formed into rigid structures having strength and cushioning properties which surpass those of paper products for many uses.

One area in which foamed plastic has been found to be deficient when compared to paper is that of flexibility. Foam sheeting, although it can be thermoformed into an almost infinite variety of shapes and configurations, normally tends to rupture upon being folded or bent. By addressing itself to, and solving, such a problem, the present invention provides a foam product that greatly increases the scope of applications in which foamed plastics may be used to advantage.

SUMMARY OF THE INVENTION

The present invention comprises a flexible, dead-foldable foamed plastic sheet having a compressed cellular structure and being further characterized by having in close proximity to at least one of its two major surfaces a quantity of fractured compressed cells sufficient in number such that the sheet is rendered dead-foldable. The compressed sheet hereinafter disclosed has both appearance and folding characteristics approaching or superior to those of paper and cardboard products while retaining the more desirable insulating and cushioning characteristics of foam and even improving on the tensile properties of the original foam sheet. The present invention also encompasses a process useful for making such flexible sheet material.

In accordance with this invention, a foam plastic sheet, e.g. polystyrene foam, is sandwiched between surfaces, at least one of which is textured (e.g., screen like), placed in a press or other suitable compressing means and compressed to reduce the thickness of the sheet while simultaneously fracturing a substantial portion of the cells of said foam sheet at one or both surfaces of said sheet. Thus, the purpose of this procedure is at least threefold:

(1) to compress the cell structure of the foam;
(2) to partially destroy the resilience and surface character of the foam; and
(3) to provide means whereby the compressed gaseous matter trapped within the foam structure can escape (e.g., by virtue of the channels formed by the screen-like structure penetrating the surface of said foam sheet).

In specific embodiments, the compression step may be effected by placing the foam sheet between surfaces having a screen-like character, between surfaces having numerous small, needle-like protrusions, between surfaces having numerous closely spaced protrusions or grooves, combinations of such devices, or with a smooth or decoratively embossing surface against one or both sides of the foam sheet.

Following the above compression step and when desired to obtain a sheet with a smoother surface and further compressed, the foam sheet can be subjected to a second compression between two smooth surfaces to further densify, or reduce the thickness of the foam sheet and also to restore some of the smooth character to the surface of the sheet.

Foam sheet processed in the aforedescribed manner possesses greatly improved folding characteristics. The extent to which it approaches any particular grade of paper or cardboard in appearance and character depends largely upon the pressure used in each of the respective stages of compression, when two compression steps are used, and upon the spacing of the protrusions in the initial compression. Additionally, the product of this process, particularly when two stages of compression are used, possesses excellent paper-like surface characteristics. It may be written upon with ink or pencil, typed on or imprinted with a stamp or printing press. Using suitable adhesives, it may be laminated to foil, plastic film or any other desired material and decorative or informative labels may be similarly attached.

The mechanical properties (including tensile strength, modulus, break strength and percent elongation) of compressed foam sheet as embodied herein are also enhanced relative to the foam sheet in its original form.

BRIEF DESCRIPTION OF THE DRAWINGS

To facilitate understanding of this invention reference is made in the description of the embodiments to the drawings in which.

DESCRIPTION OF THE PREFERRED EMBODIMENTS

Figure 1:
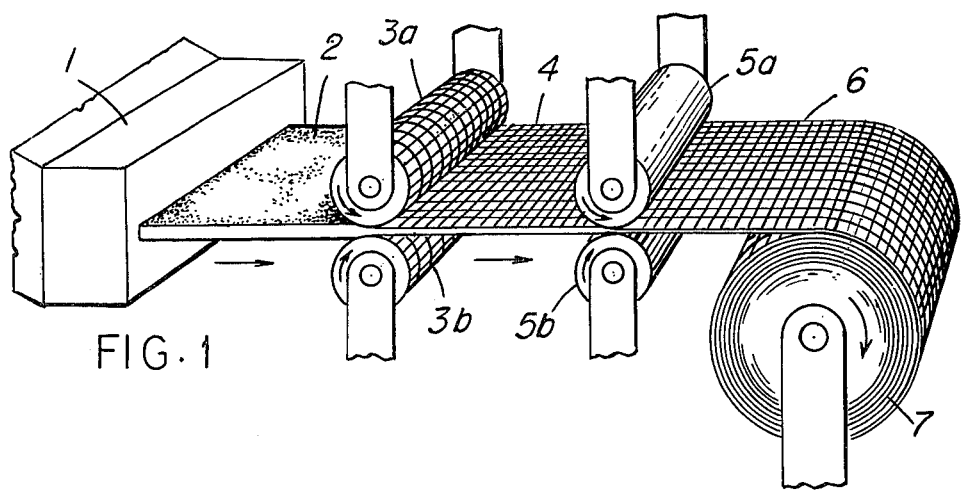
FIG. 1 is a perspective view of an apparatus assembly useful for carrying out the process of this invention.

In one of the preferred embodiments the process of this invention is carried out by forming a sandwich comprising a sheet of foam plastic material contacted on top and bottom by a flat plate and applying suitable pressure thereon, as illustrated in the drawings by FIGS. 6, 6A, 7 and 7A. More specifically, a sheet of foam material 12 is placed between two textured plates 13a and 13b, herein shown as having a screen-like structure but other designs having closely spaced protrusions and/or grooves as may occur to one skilled in the art and will accomplish the intended purpose may be substituted therefor. The resultant sandwich (i.e.—textured plate 13a, foam sheet 12 and textured plate 13b) is then compressed by suitable means, illustrated symbolically in FIG. 6A by arrows 14.

Figure 7A:
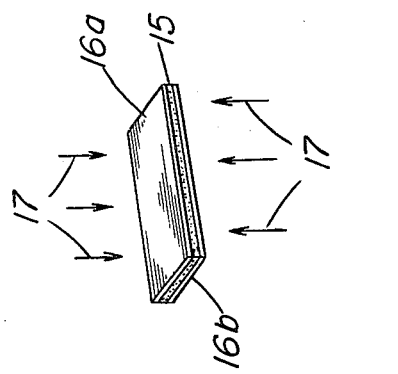
FIGS. 7 and 7A are diagrammatic views of the embodiment of FIG. 6 wherein flat smooth plates are used in the secondary compression step and arrows are again used symbolically to indicate the compression means.
Figure 7:
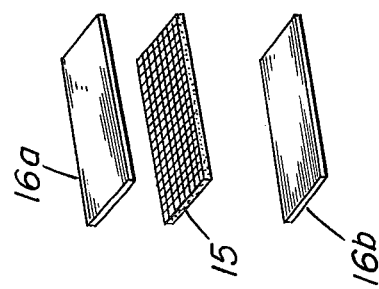
Figure 6A:
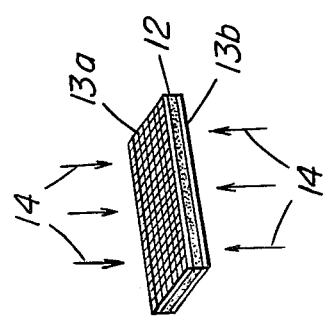
FIGS. 6 and 6A are diagrammatic views showing another embodiment of the process of this invention wherein flat screen-like plates are used in the initial compression step and arrows are used symbolically to indicate the compression means.
Figure 6:
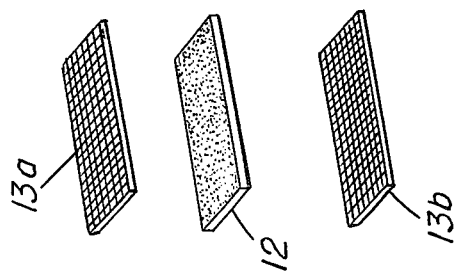

After this initial compression step the textured plates 13a and 13b are removed, leaving foam material 15 which has a thickness less than that of the original foam sheet 12 and contains impressions of the surface pattern of plates 13a and 13b. This foam material 15 may then be placed between plates 16a and 16b, if a smoother or thinner sheet is desired, said plates having smooth surfaces and the resulting sandwich compressed by suitable means as illustrated in FIG. 7A by arrows 17. In this second compression step the foam material is further reduced in thickness and also the depth and intensity of the surface impressions left by 13a and 13b are reduced, thereby restoring a degree of smoothness to the surface of the foam sheet.

The product resulting from this process will be thinner and more dense than the starting foam sheet 12, will have relatively smooth surface character and will be highly flexible and foldable as well as possessing improved mechanical strength.

Foam sheet material processed in the described manner is capable of being dead-folded, which is to say that the material may be creased and folded back upon itself and the foam sheet in the immediate vicinity of the fold will thereafter remain substantially in the folded configuration. The surface of such folded sheet will not rupture merely by virtue of its being folded, as would the surface of a conventional compressed or uncompressed foamed plastic sheet if one were to attempt to fold such conventional sheet back upon itself. The present material is thereby suitable for folding into cartons, box liners, bags, wrappers for various commodities, etc., or for use as a flat sheet in such applications traditionally filled by paper as typewriting and printing medium, envelopes, stationery, and so forth.

Figure 2:
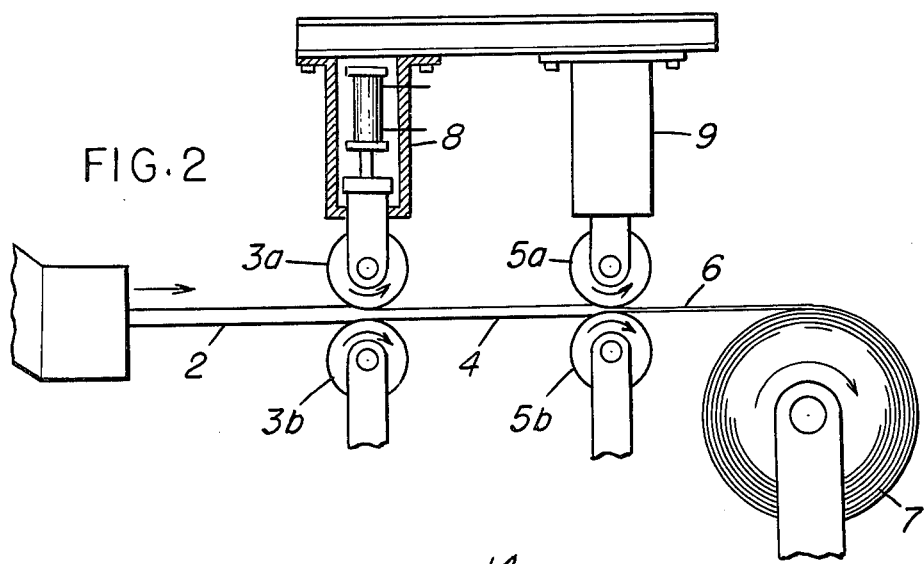
FIG. 2 is a side elevation of the assembly of FIG. 1.

An embodiment of the process of this invention is further illustrated by FIGS. 1 and 2 in the drawings. Referring to FIG. 1, foam plastic sheet 2 is fed from supply source 1, which may be a foam extrusion device, a roll of previously formed foam material or any other suitable source of foam plastic material, to a pair of counter-rotating nip rollers 3a and 3b. Foam sheet 2, having a thickness of 10 mils to 200 mils and preferably 10 mils to 100 mils and a density of about 0.02 gm. per cubic centimeter to about 1.0 gm. per cubic centimeter and preferably 0.050 gm. per cubic centimeter to 0.25 gm. per cubic centimeter, is passed between nip rollers 3a and 3b, the surfaces of which comprise a screen-like structure, and is initially compressed or reduced to desired thickness (preferably 3 mils to 25 mils) by means of a predetermined pressure applied on foam sheet 2 by rollers 3a and 3b via a suitable (e.g., piston type) load producing means 8 (see FIG. 2).

The textured surfaces of rollers 3a and 3b partially penetrate the surface of foam sheet 2 (see FIG. 5) at the same time that it is being compressed by said rollers, thereby effecting surface cell fracture and facilitating the escape of some of the gaseous material contained within the now compressed internal cell structure of the foam sheet. The rupture of at least a substantial portion of the compressed cells provides a maximum reduction in the thickness of the foam sheet as it passes between the rollers and prevents the sheet material from returning to its original thickness after the applied pressure is removed. The degree of thickness reduction imparted to the foam sheet in this step will depend upon several factors, primarily the pressure applied between the nip rollers and the amount of cell rupture, and these factors may be varied to achieve end-product characteristics as desired.

Upon leaving rollers 3a and 3b the foam material 4, reduced in thickness from that of foam sheet 2 and containing impressions of the surface pattern of rollers 3a and 3b, may be passed between counter-rotating smooth surface nip rollers 5a and 5b. Rollers 5a and 5b press against foam 4 with a predetermined force applied via a suitable load producing means 9 (see FIG. 2), further reducing the thickness of the foam material and also reducing the depth and intensity of the impressions left by 3a and 3b thereby restoring a desired degree of smoothness to the surface of the foam sheet. The amount of additional thickness reduction achieved over the initial compression step can be substantial and will depend primarily upon the pressure applied between 5a and 5b.

The thinned, flexible, relatively smooth product 6, having a thickness which is preferably in the range of 2 mils to 20 mils, is then wound on take-up roll 17 for transport and storage. Alternately, product 6 may be fed directly to appropriate subsequent process means where it is cut or otherwise formed into a desired end product.

Load producing means 8 and 9 are shown as functioning with rollers 3a and 5a, respectively, and comprising a piston-like construction for illustrative purposes only. They may be attached to any combination of rollers and be of any construction which would accomplish the intended functions as set forth in the preferred embodiments.

Figures 3, 4, 5:
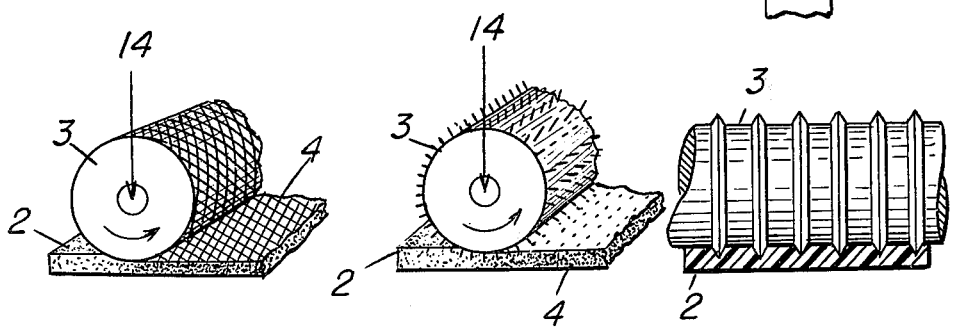
FIGS. 3, 4 and 5 are sections of the primary roller of the assembly of FIG. 1 showing alternate surface texture patterns useful in the practice of the invention and foam sheeting after being compressed thereby.

The pattern of protrusion, grooves, indentations, etc. used on the rollers in the primary compression step may be of any design to accomplish the desired amount of cell rupture. The drawings illustrate, as embodiments, four sample patterns which may be used in the practice of this invention: FIG. 1 shows a pattern of rectangular, screen-like protrusions; FIG. 3 shows a similar gridwork which is diagonally disposed on the roller; FIG. 4 shows a pattern of closely spaced needle-like protrusions; and FIG. 5 illustrates a series of closely spaced ridge-like structures. Other patterns which may occur to one skilled in the art may be substituted for those without departing from the spirit and scope of this invention.

In practice of this invention, one or more of the rollers, for instance 3a or 5a, may be replaced with another roller designed to impart a purely decorative embossing on one side of the foam sheet to achieve some particular and desired effect. One such decorative effect would be to give the product an alligator skin-like texture, but many other designs are possible and will be obvious to those skilled in the art.

EXAMPLES

In a plurality or runs, as set forth in Table I, polystyrene foam sheets ranging in average thickness from 90 mils to 121 mils were in individual runs sandwiched between two screens of defined mesh size. The sandwich was then placed in a press and initially compressed at 800–5,000 psi. The initially compressed polystyrene foam sheets, upon removal from the press, were then placed between two smooth surface plates and compressed again, this time at 4,775 psi. The following Table I tabulates in detail for each run the thickness of the starting polystyrene foam sheet and of the foam sheet after each compression step, the mesh size of the screen assembly for the initial compression step, the pressure employed for each compression step and the percent change in thickness resulting from each step.

17 which were bendable and foldable without rupturing.

These runs were all conducted at ambient temperature and, since the amount of compression resulting from any given combination of mesh size and pressure is

TABLE I

| Run No. | Average Initial Thickness | Primary Compression Step | | | | Secondary Compression Step | | |
|---|---|---|---|---|---|---|---|---|
| | | Mesh Size | PSI | Average Sheet Thickness | % Change | PSI | Average Sheet Thickness | % Change |
| 1 | 91.8 mils | 20 | 378 | 34.3 mils | 62.6 | 4775 | 18.8 mils | 79.5 |
| 2 | 100.3 mils | 20 | 796 | 35.6 mils | 64.6 | 4775 | 15.3 mils | 84.7 |
| 3 | 107.8 mils | 20 | 1,591 | 25.8 mils | 76.1 | 4775 | 15.3 mils | 85.8 |
| 4 | 115.3 mils | 20 | 3,182 | 24.4 mils | 78.5 | 4775 | 15.0 mils | 87.0 |
| 5 | 91.0 mils | 20 | 3,182 | 21.8 mils | 76.0 | 4775 | 14.0 mils | 84.6 |
| 6 | 90.5 mils | 20 | 4,775 | 22.6 mils | 75.0 | 4775 | 13.3 mils | 85.3 |
| 7 | 117.0 mils | 40 | 1,591 | 29.3 mils | 75.0 | 4775 | 18.2 mils | 84.4 |
| 8 | 117.8 mils | 40 | 2,387 | 21.6 mils | 81.7 | 4775 | 14.4 mils | 87.8 |
| 9 | 102.3 mils | 40 | 3,182 | 25.3 mils | 75.3 | 4775 | 12.3 mils | 88.0 |
| 10 | 102.3 mils | 40 | 4,775 | 15.1 mils | 85.2 | 4775 | 12.1 mils | 88.2 |
| 11 | 121.0 mils | 60 | 1,591 | 35.0 mils | 71.1 | 4775 | 19.8 mils | 83.0 |
| 12 | 96.3 mils | 60 | 2,387 | 12.9 mils | 86.6 | 4775 | 11.4 mils | 88.2 |
| 13 | 94.0 mils | 60 | 3,182 | 11.9 mils | 87.3 | 4775 | 10.6 mils | 88.7 |
| 14 | 107.8 mils | 60 | 4,775 | 13.8 mils | 87.2 | 4775 | 12.4 mils | 88.5 |
| 15 | 114.0 mils | 80 | 3,182 | 27.7 mils | 75.7 | 4775 | 16.6 mils | 85.4 |
| 16 | 115.0 mils | 80 | 3,978 | 26.0 mils | 77.4 | 4775 | 17.1 mils | 85.1 |
| 17 | 91.3 mils | 80 | 4,775 | 10.9 mils | 88.1 | 4775 | 10.2 mils | 88.9 |
| 18 | 110.3 mils | smooth surface plates I | 1,591 | 56.3 mils | 49.0 | 4775 | 31.6 mils | 71.3 |
| 19 | 94.0 mils | | 3,182 | 40.4 mils | 57.0 | 4775 | 26.8 mils | 71.5 |
| 20 | 106.0 mils | | 4,775 | 34.8 mils | 67.2 | 4775 | 22.5 mils | 78.8 |

The data shows the effect of varying the pressure used in the initial compression step for any given mesh size and also the effect obtained from varying the mesh size used in that same step. As can be seen, each mesh size has a minimum pressure which must be applied to obtain maximum compression, but the application of substantially greater pressure beyond that minimum point produces little additional benefit. As the mesh size is increased (i.e.—the openings become smaller) the minimum pressure applied to achieve optimum compression is also increased.

Run Nos. 18, 19 and 20 are included for purposes of comparison. In these runs the screens used in the initial compression step were removed and replaced with flat plates so that the end product was the result of two pressings between flat plates. As can be seen from the data, even at the highest pressures the reduction in thickness was less than that obtained by practice of this invention. In addition, the compressed foam sheet obtained from these runs was rigid and brittle, unlike the compressed sheets obtained from Run Nos. 1 through 17 which were bendable and foldable without rupturing.

a function of the temperature of the foam sheet, it must be realized that the degree of compression shown in Table I is a reflection only of the operating parameters used and is in no way limiting. It is contemplated that as the temperature is increased the optimum pressure required for compression at any given mesh size will decrease. One of the preferred embodiments places the process of this invention directly on the production line after the extruder and it is to be expected that the foam sheet will be at elevated temperature. The process of this invention is, in fact, useful at temperatures up to and including the glass transition temperature of the foam plastic material.

Table II set forth data on the results of standard mechanical tests carried out on the products from the noted runs of Table I. The testing methods were as follows:

| Tensile Modulus | A.S.T.M. | D-638 |
|---|---|---|
| Break Strength | A.S.T.M. | D-638 |
| % Elongation | A.S.T.M. | D-638 |

TABLE II

| No. | Tensile Modulus × $10^4$ psi | | | Break Strength × $10^3$ psi | | | Elongation at Break, % | | |
|---|---|---|---|---|---|---|---|---|---|
| | MD | TD | 45° | MD | TD | 45° | MD | TD | 45° |
| Control (uncompressed foam) | 0.97 | 0.59 | 0.66 | 0.17 | 0.14 | 0.16 | 4 | 4 | 4 |
| 2 | 4.73 | 2.10 | 2.11 | 1.35 | 0.72 | 0.69 | 9 | 6 | 6 |
| 10 | 1.60 | 0.80 | 1.18 | 0.39 | 0.26 | 0.28 | 4 | 4 | 4 |
| 11 | 3.85 | 1.25 | 2.76 | 0.85 | 0.40 | 0.70 | 6 | 11 | 9 |
| 12 | 3.79 | 2.44 | 2.37 | 0.81 | 0.54 | 0.56 | 5 | 8 | 9 |
| 13 | 4.56 | 2.24 | 2.53 | 0.79 | 0.49 | 0.60 | 4 | 7 | 9 |
| 14 | 2.45 | 0.95 | 1.19 | 0.70 | 0.40 | 0.40 | 7 | 6 | 6 |
| 15 | 1.34 | 0.91 | 1.07 | 0.46 | 0.35 | 0.38 | 8 | 8 | 9 |

TABLE II-continued

| No. | Tensile Modulus × 10⁴ psi | | | Break Strength × 10³ psi | | | Elongation at Break, % | | |
|---|---|---|---|---|---|---|---|---|---|
| | MD | TD | 45° | MD | TD | 45° | MD | TD | 45° |
| 17 | 2.72 | 0.66 | 2.27 | 0.69 | 0.31 | 0.64 | 6 | 9 | 8 |

All of the tested samples exhibited increased break strength and tensile modulus over the results obtained for the sample of uncompressed foam. With the exception of Run No. 10, all of the samples also showed increased elasticity (% elongation at break) over the uncompressed foam. While Run No. 10 gave the same value for elongation as did the control sample, there was no indication of loss of elasticity.

Table III demonstrates the effect of compressing foam material of different thicknesses using identical conditions for compression. Primary compression for all samples was carried out using a 60 mesh screen at 3180 psi. Secondary compression was between smooth plates at 4,800 psi.

TABLE III

| Sheet | Average Starting Thickness Mils | Density gms/cc | Final Thickness Mils | Thickness Change, % | Final Density gms/cc |
|---|---|---|---|---|---|
| A | 50 | .114 | 13.5 | 73.0 | .423 |
| B | 81 | .074 | 20.0 | 75.3 | .300 |
| C | 98 | .124 | 49.0 | 50.0 | .248 |
| D | 78 | .098 | 13.0 | 83.3 | .588 |
| E | 90 | .051 | 10.0 | 88.8 | .459 |

Table IV shows the results of standard mechanical tests conducted on the materials of Table III. The testing methods were as follows:

| Tear Strength | Trouser Tear (50"/min.) |
|---|---|
| Tensile Strength ASTM | D-638 |
| Tensile Modulus ASTM | D-638 |

TABLE IV

| Sample Foam | | Density (gm/cc) I | F | Thickness (mils) | Tear St. 50"/min. (gm/mil) | Tensile St. (psi) | Modulus psi × 10³ |
|---|---|---|---|---|---|---|---|
| A | MD | .114 | .423 | 13.5 | 2.0 | 2850 | 75 |
|   | TD |      |      |      | 6.0 | 1080 | 25 |
| B | MD | .074 | .300 | 20.0 | 3.7 | 1280 | 39 |
|   | TD |      |      |      | 4.4 | 630  | 17 |
| C | MD | .124 | .248 | 50.0 | 4.7 | 1260 | 50 |
|   | TD |      |      |      | 4.3 | 930  | 30 |
| D | MD | .098 | .588 | 13.0 | 3.0 | 2430 | 86 |
|   | TD |      |      |      | 8.4 | 1330 | 66 |
| E | MD | .051 | .459 | 10.0 | 2.3 | 2400 | 93 |
|   | TD |      |      |      | 3.9 | 2050 | 51 |

MD = Machine Direction
TD = Transverse Direction
I = Initial
F = Final

Although the present invention has been described with reference to the preferred embodiments, it should be understood that modifications and variations may be resorted to without departing from the spirit and scope of the invention, as those skilled in the art will readily understand.

What is claimed is:

1. A flexible, dead-foldable foamed plastic sheet having a compressed cellular structure, said sheet being further characterized by having in close proximity to at least one of its two major surfaces a substantial number of fractured compressed cells such that said sheet is rendered dead-foldable.

2. The flexible, dead-foldable foamed plastic sheet of claim 1 wherein there are fractured compressed cells in close proximity to each of said two major surfaces, said fractured cells being in sufficient number such that said sheet is rendered dead-foldable.

3. The flexible, dead-foldable foamed plastic sheet of claim 2 bonded on at least one surface thereof to another material to form a multilayer sheet.

4. The flexible, dead-foldable foamed plastic sheet of claim 1 further comprising decorative embossing on one of said two major surfaces.

5. The flexible, dead-foldable foamed plastic sheet of claim 1 wherein said compressed cellular structure and said fractured compressed cells are substantially restricted to the portion of said foamed plastic sheet to be folded and the cellular structure of substantially all of said sheet not in the vicinity of said foldable portion is in its original uncompressed state.

6. The flexible, dead-foldable foamed plastic sheet of claims 1, 2, 3, 4 or 5 wherein said plastic material is polystyrene.

* * * * *